(No Model.)

R. M. HUNTER.
UNDERGROUND CONDUCTOR.

No. 275,387. Patented Apr. 10, 1883.

Attest:
West
H. McWade

Inventor
Rudolph M. Hunter

UNITED STATES PATENT OFFICE.

RUDOLPH M. HUNTER, OF PHILADELPHIA, PENNSYLVANIA.

UNDERGROUND CONDUCTOR.

SPECIFICATION forming part of Letters Patent No. 275,387, dated April 10, 1883.

Application filed December 12, 1882. (No model.)

*To all whom it may concern:*

Be it known that I, RUDOLPH M. HUNTER, of the city and county of Philadelphia, and State of Pennsylvania, have invented an Improvement in Underground Conductors, of which the following is a specification.

My invention has reference to underground conduits for electric wires in general; and it consists in providing said conduit with means to force air or gas into same under pressure, and adapted to keep the said air or gas under pressure continually, if so desired; further, in providing the conduit with one or more receptacles adapted to contain absorbents for moisture, and in many details of construction, all of which is fully set forth in the following specification and shown in the accompanying drawings, which form part thereof.

The object of my invention is to provide suitable means to prevent the escape of electricity from the wires in underground conduits or reduce the escapage to a minimum. This is particularly necessary in the use of underground electric-light wires, for on long circuits the lights on the farthest end of the line or circuit burn dimly and are incapable of giving that brilliancy of illumination for which they are designed unless the intensity of the electric current is greatly increased over the normal, and this is injurious to the lamps near dynamo-electric machines, and requires a greatly-increased expenditure of power used in the generation of the current. By the use of my invention the distant lamps burn as brilliantly as those near the generators and all burn with a maximum brilliancy without increasing the intensity of the current over the normal, and with a minimum expenditure of power. My invention depends principally upon two phenomena—viz., the absorption of the moisture from within the conduit by chemicals to prevent undue escape of electricity, the moisture rendering the air in the conduit a good conductor, and increasing the pressure of the air or gaseous medium around the conductors and within the conduit, the same preventing the free escape of electricity from the wires. The greater the pressure and more free the air is from moisture the less liability is there for the escape of electricity.

Figure 1:
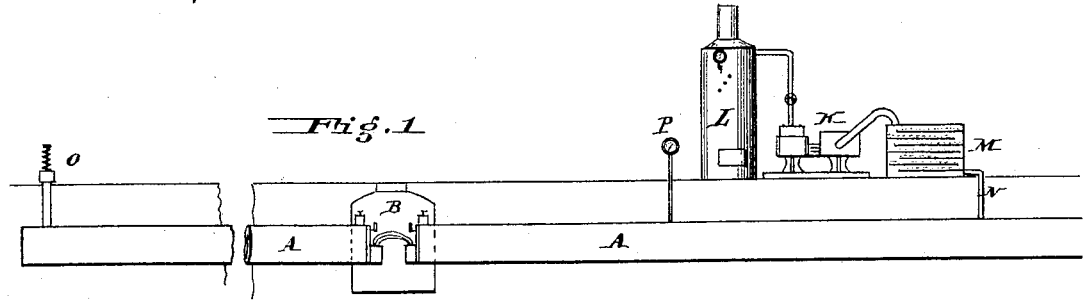
Figure 2:
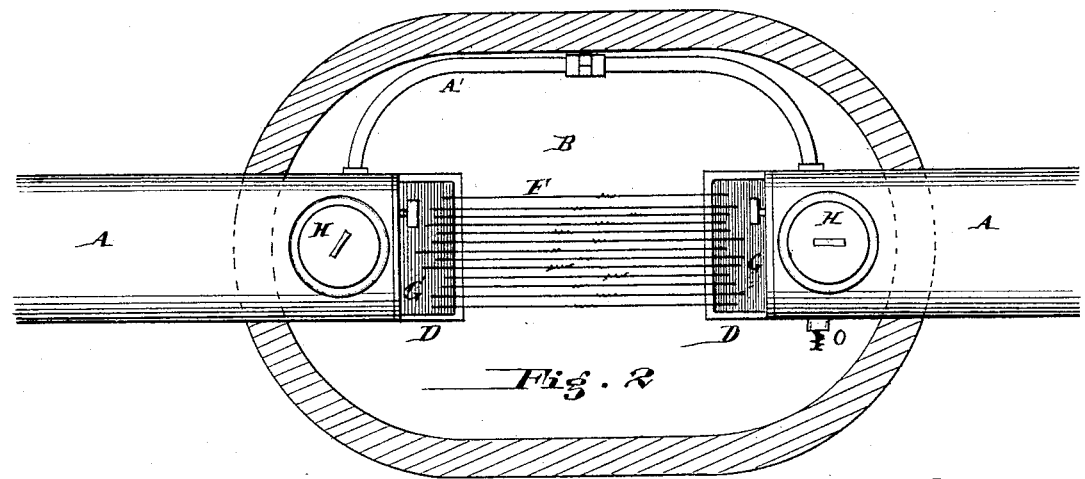
Figure 3:
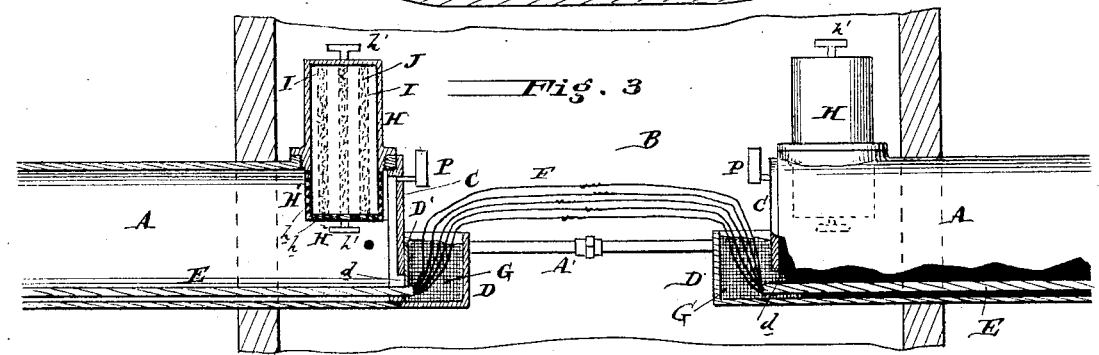
Figures 4, 5:
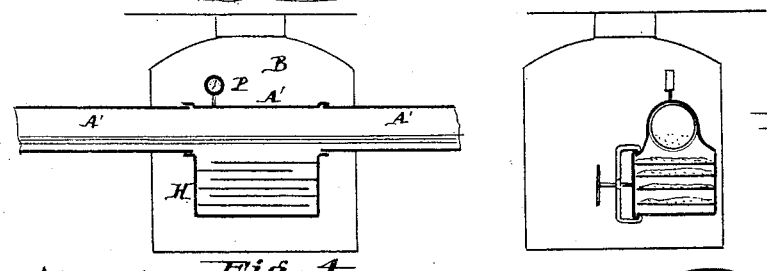

In the drawings, Figure 1 is an elevation of my improved main as arranged under ground. Fig. 2 is a plan view of the conduits and a station thereon. Fig. 3 is a sectional elevation through one of the stations on line $y\,y$. Fig. 4 is a similar view, showing a modification, and Fig. 5 is a cross-section of same on line $x\,x$.

A is the conduit, and may be made of cast or wrought iron or any other suitable material.

B are the stations, which may be at each square, and receive the ends of each section of conduit.

A' are air-pipes, which connect the two adjacent ends of the conduit's sections together and allow air to pass from one to the other.

C are caps which close the end of the conduits, and are provided with basins D, and have an aperture, $d$.

E represents a cable of any desired construction, the end of which is brought through the apertures $d$ and over the wires F, then separated. A plate, D', is then placed over the opening $d$, and pitch or a cement, G, is poured in to seal up the opening and make it air-tight. The wires F are connected from section to section, as shown. Single wires may be used in place of cables, and, if desired, the plate D may be dispensed with. The end of each section or any given number of sections of conduit is provided with a receptacle, H, to contain an absorbent powder or liquid for moisture. Sulphuric acid, dehydrated lime, chloride of lime, &c., may be used, and when a powder is used I prefer to make the receptacle H as follows: The body is cylindrical, part or all of same extending into the conduit, with an air-tight joint. The part H' within the conduit is provided with a screw cap or end, H², and the sides and end are perforated; or these parts may be made of gauze, and the material J is supported in vertical or horizontal layers by wire-gauze plates I. $h'$ are handles. Once a week, or other given period, all of these receptacles are changed, fresh ones being substituted for the old ones, and the moisture contained in the old material may be again dehydrated and used over again. In place of separating the sections A, they may be made continuous, as shown in Fig. 4, and the connecting-piece provided with shelves for the moisture-absorbent.

The electric generating-station is provided with a boiler, L, and an air or gas pump, K, This pump or air-compressor may force the air directly into the conduit by pipe N, or first through a receptacle, M, containing an absorbent for moisture, and then into the conduit.

P are gages to indicate the pressure in the conduit at various points in its length, and O is a safety-valve, designed to prevent bursting of the main if the air is put under too great pressure from any means. If desired, each section may be provided with a safety-valve, in which case it would be desirable to place them in the stations. When the receptacle M is used part or all of the receptacles H may be dispensed with. The air is forced into the conduit by the air-compressor K, and passes from one section to the other by pipes A, placing all of the electric conductors under practically uniform pressure. The compressor K may be run at intervals or continuously when the cable or electric conductors are in use. I do not limit myself to any particular pressure of air.

Having now described my invention, what I claim as new, and desire to secure by Letters Patent, is—

1. An underground conduit, made air-tight, in combination with electric wires, an air-compressor at one end of said conduit and adapted to constantly force air or gas into said conduit under excessive pressure, and an escape or pressure valve adapted to remain closed until the desired pressure of air is obtained, and attached to said conduit at its other end to cause a constant circulation of air or gas under high pressure through said conduit, substantially as and for the purpose specified.

2. An underground conduit, made air-tight, in combination with electric wires inclosed therein, escape or relief valves, adapted to remain closed unless the pressure in the main or conduit increases above a given point, arranged upon said conduit at various places along the same, and means to force a constant current of air or gas under pressure into said main and out through said relief-valves, and thereby insure a perfect circulation of air under pressure, substantially as set forth.

3. An underground conduit, made air-tight, in combination with electric wires inclosed therein, escape or relief valves arranged upon said conduit at various places along the same, and means to force a constant current of air or gas under pressure into said main and out through said relief-valves, and thereby insure a perfect circulation of air under pressure, and apparatus to contain an absorbent for the extraction of the moisture from said compressed air or gas, substantially as set forth.

4. An underground conduit, made air-tight, in combination with electric wires inclosed therein, escape or relief valves arranged upon said conduit at various places along the same, and means to force a constant current of air or gas under pressure into said main and out through said relief-valves, and thereby insure a perfect circulation of air under pressure, stations in which said electric wires may be exposed for testing or adding new circuits, the said relief-valve being located within said stations, substantially as and for the purpose specified.

5. The combination of conduit A with compressor K, absorbent apparatus M, pipe N at one end, and relief-valve O at the other end, substantially as and for the purpose specified.

6. An underground conduit, made air-tight, in combination with means to force air or gas into said conduit under pressure, one or more safety-valves to allow escape of any air or gas under excessive pressure, and thereby tend to keep the pressure in the conduit uniform and prevent influx of air from the atmosphere, and one or more pressure-gages on said conduit and at intervals along the same, whereby the normal pressure and any leak may be readily ascertained, substantially as and for the purpose specified.

7. The combination of conduit-sections A, having their ends extended into the stations and hermetically sealed, connecting-pipes A', of small diameter connecting the interiors of the adjacent sections A, and stations B, substantially as and for the purpose specified.

8. The combination of conduit-sections A, wires F, basins D, cement G, and stations B, substantially as and for the purpose specified.

9. The combination of conduit-sections A, detachable absorbent-receptacles H, having perforated parts H' H², and absorbent material J, substantially as and for the purpose specified.

In testimony of which invention I hereunto set my hand.

R. M. HUNTER.

Witnesses:
R. S. CHILD, Jr.,
R. A. CAVIN.